United States Patent
Sharma et al.

(10) Patent No.: US 8,032,876 B2
(45) Date of Patent: Oct. 4, 2011

(54) METHOD AND APPARATUS FOR RESTRUCTURING A SOFTWARE PROGRAM HIERARCHY

(75) Inventors: Shachindra Sharma, Noida (IN); Sourav Nandy, Ghaziabad (IN); Deepak Soi, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 1034 days.

(21) Appl. No.: 11/773,600

(22) Filed: Jul. 5, 2007

(65) Prior Publication Data

US 2009/0013315 A1   Jan. 8, 2009

(51) Int. Cl.
 *G06F 9/45* (2006.01)
(52) U.S. Cl. .......... 717/159; 717/101
(58) Field of Classification Search .......... 717/101–113, 717/120–123, 169–173, 159–161
See application file for complete search history.

(56) References Cited

U.S. PATENT DOCUMENTS 7,523,023 B1 * 4/2009 Koh et al. .......... 703/2

OTHER PUBLICATIONS

Tamiya Onodera, "Reducing Compilation Time by a Compilation Server", May 1993, IBM Research, Software-Practice and Experience, vol. 23(5), pp. 477-485.*

* cited by examiner

*Primary Examiner* — Ted T Vo
(74) *Attorney, Agent, or Firm* — Holland & Knight LLP; Brian J Colandreo, Esq.; Mark H Whittenberger, Esq.

(57) ABSTRACT

Method, apparatus, and computer readable medium for restructuring a software program hierarchy having interface files and implementation files that include the interface files are described. In one example, dependencies between program units in the interface files and the implementation files are determined. The dependencies are represented as a plurality of bit strings. Correlated bitstrings of the plurality of bit strings are clustered into a plurality of partitions. Each of the plurality of partitions is transformed into corresponding program units. New interface files are respectively created having the corresponding program units for each of the plurality of partitions.

20 Claims, 5 Drawing Sheets

| SOURCE FILE 302 | PROGRAM UNITS NEEDED 304 |
|---|---|
| IMPL A.C  — 306 | A,E |
| IMPL B.C  — 308 | B,C,D |
| IMPL C.C  — 310 | A,E |
| PROGRAM. C  — 312 | A,B,C,D |

| | A (402) | B (404) | C (406) | D (408) | E (410) |
|---|---|---|---|---|---|
| IMPL A.C  — 412 | 1 | 0 | 0 | 0 | 1 |
| IMPL B.C  — 416 | 0 | 1 | 1 | 1 | 0 |
| IMPL C.C  — 418 | 1 | 0 | 0 | 0 | 1 |
| PROGRAM. C  — 420 | 1 | 1 | 1 | 1 | 0 |

METHOD AND APPARATUS FOR RESTRUCTURING A SOFTWARE PROGRAM HIERARCHY

BACKGROUND OF THE INVENTION

1. Field of the Invention

Embodiments of the invention generally relate to software management and, more specifically, to a method and apparatus for restructuring a software program hierarchy.

2. Description of the Related Art

Legacy software systems typically include a deep and complex interface file hierarchy. In such systems, one interface file may in turn include several other interface files and so on. Moreover, multiple implementation files can include the same interface file. This results in the same set of interface files being compiled repeatedly with each implementation file they are included in. As such, larger than required interface files will have a detrimental effect on compilation times and preprocessed code size.

Factors like adaptations due to market demand, internal debugging and maintenance, individual developer coding styles, and the like lead to increased software entropy. Software entropy is manifested in the form of false dependencies between interface and implementation files. There are several drawbacks of false dependencies. Notably, they increase the preprocessed code size due to inclusion of unnecessary program units. Fresh and incremental compilation times increases loading, parsing and compilation of unnecessarily included program units in each implementation file. These problems make the software system harder and costlier to maintain. In fact, it is the incremental compilation time that impacts the developer efficiency the most. An increase in incremental compile time amounts to practically equivalent stalling of development and testing time. This is directly proportional to increased cost in terms of developer salary, wastage of resources, etc. So there is a need to devise a scheme for restructuring the interfaces such that the program units are placed in the interfaces in a manner so that the false and redundant dependencies are minimized.

Existing approaches try to optimize the interfaces by translating the dependencies to a graph and then partitioning the graph so that only true dependencies are left and false dependencies are removed. The source code is then regenerated based on the true dependencies to achieve better cohesion and reduced coupling between the files. The major drawback of these approaches is unsupervised reorganization and regeneration of the code and header file hierarchy, which in a large productized environment is often impractical. The techniques provide no means by which user can control the extent of distortion that the overall software system will incur as part of the approach. Moreover, the techniques only work in a corrective and not in a prophylactic manner. Such techniques do not aid the user in deciding whether or not the placement of a new program unit during development will degrade the dependency structure. In addition, graph based algorithms are not very suitable for handling of large datasets.

Accordingly, there exists a need in the art for a method and apparatus for restructuring a software program hierarchy having implementation files and interface files that overcome the aforementioned deficiencies.

SUMMARY OF THE INVENTION

Method, apparatus, and computer readable medium for restructuring a software program hierarchy having interface files and implementation files that include the interface files are described. In one embodiment, dependencies between program units in the interface files and the implementation files are determined. The dependencies are represented as a plurality of bit strings. Correlated bit strings are clustered into a plurality of partitions. Each of the plurality of partitions is transformed into corresponding program units. New interface files are respectively created having the corresponding program units for each of the plurality of partitions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Method and apparatus for restructuring a software program hierarchy having interface files and implementation files that include the interface files are described. One or more aspects of the invention relate to a refactoring technique (also referred to as restructuring) that addresses the issue of software entropy across interface files in a software program hierarchy. Embodiments relate to a user-supervised, automated technique based on clustering. The invention provides for reduction in complexity and cost of maintenance of large and legacy software programs, such as C/C++ software systems. Such software programs typically comprise a large number of implementation and interface files and hence exhibit a complex dependency structure. Embodiments of the invention optimize pre-processed code size introduced due to inclusion of unnecessary program units in interface files.

Aspects of the invention may be understood with respect to the following definitions:

Program Units: The term program units is collectively used to represent common data structures, function prototypes, variables, preprocessor macros and directives, and the like used by different modules in a software program.

Interface Files: An interface file (also referred to as a header file or include file) is a textual representation describing a program unit's relationship to other modules. This textual representation conforms to the semantics of the particular programming language.

Implementation Files: An implementation file (also referred to as a source file) is a textual representation of a desired sequence of programming statements that implement a program or portion of a program. The implementation files require program units for compilation and include interface files by a preprocessor directive (e.g., a '#include' directive in C/C++).

False Dependency: False dependency is created between implementation files due to inclusion of a program unit in an implementation file via the interface file, although the implementation file actually does not require the program unit for compilation. The dependency is introduced due to the interface file including unnecessary program units.

Software Entropy: Software entropy is the tendency of a software program to become difficult and costly to maintain with time. A software program that undergoes continuous change, such as having new functionality added to its original design, will eventually become more complex and can become disorganized as it grows, losing its original design structure.

Figure 1:
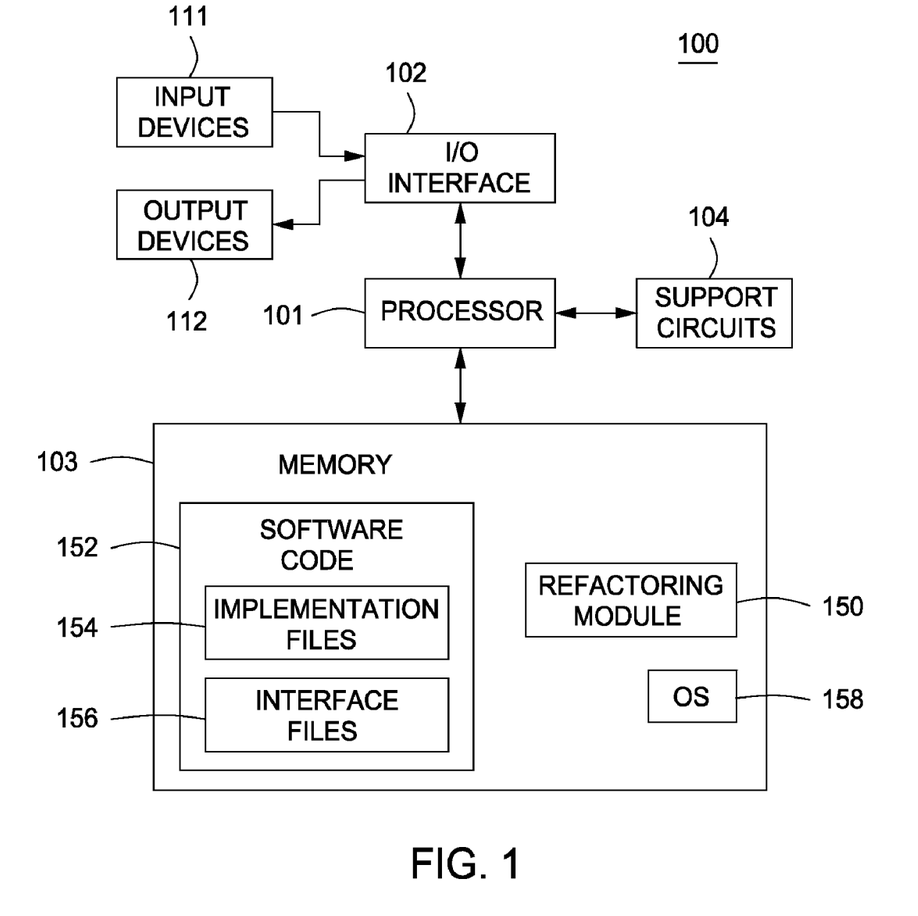
FIG. 1 is a block diagram depicting an exemplary embodiment of a computer suitable for implementing the processes described herein in accordance with one or more aspects of the invention.

FIG. 1 is a block diagram depicting an exemplary embodiment of a computer 100 suitable for implementing the processes described herein in accordance with one or more aspects of the invention. The computer 100 includes a processor 101, a memory 103, various support circuits 104, and an I/O interface 102. The processor 101 may include one or more microprocessors known in the art. The support circuits 104 for the processor 101 include conventional cache, power supplies, clock circuits, data registers, I/O interfaces, and the like. The I/O interface 102 may be directly coupled to the memory 103 or coupled through the processor 101. The I/O interface 102 is coupled to various input devices 111 (e.g., keyboard, mouse, and the like) and output devices 112 (e.g., display, printer, and the like).

The memory 103 stores processor-executable instructions and/or data that may be executed by and/or used by the processor 101. These processor-executable instructions may comprise hardware, firmware, software, and the like, or some combination thereof. Modules having processor-executable instructions that are stored in the memory 103 include refactoring module 150. Data stored in the memory 103 includes software code 152. The software code 152 includes a software program hierarchy having implementation files 154 and interface files 156. The computer 100 may be programmed with an operating system 158, which may be OS/2, JAVA VIRTUAL MACHINE, LINUX, SOLARIS, UNIX, WINDOWS, WINDOWS 95, WINDOWS 98, WINDOWS NT, and WINDOWS 2000, WINDOWS ME, and WINDOWS XP, among other known platforms. At least a portion of an operating system 158 may be disposed in the memory 103. The memory 103 may include one or more of the following random access memory, read only memory, magneto-resistive read/write memory, optical read/write memory, cache memory, magnetic read/write memory, and the like, as well as signal-bearing media as described below.

Figure 2:
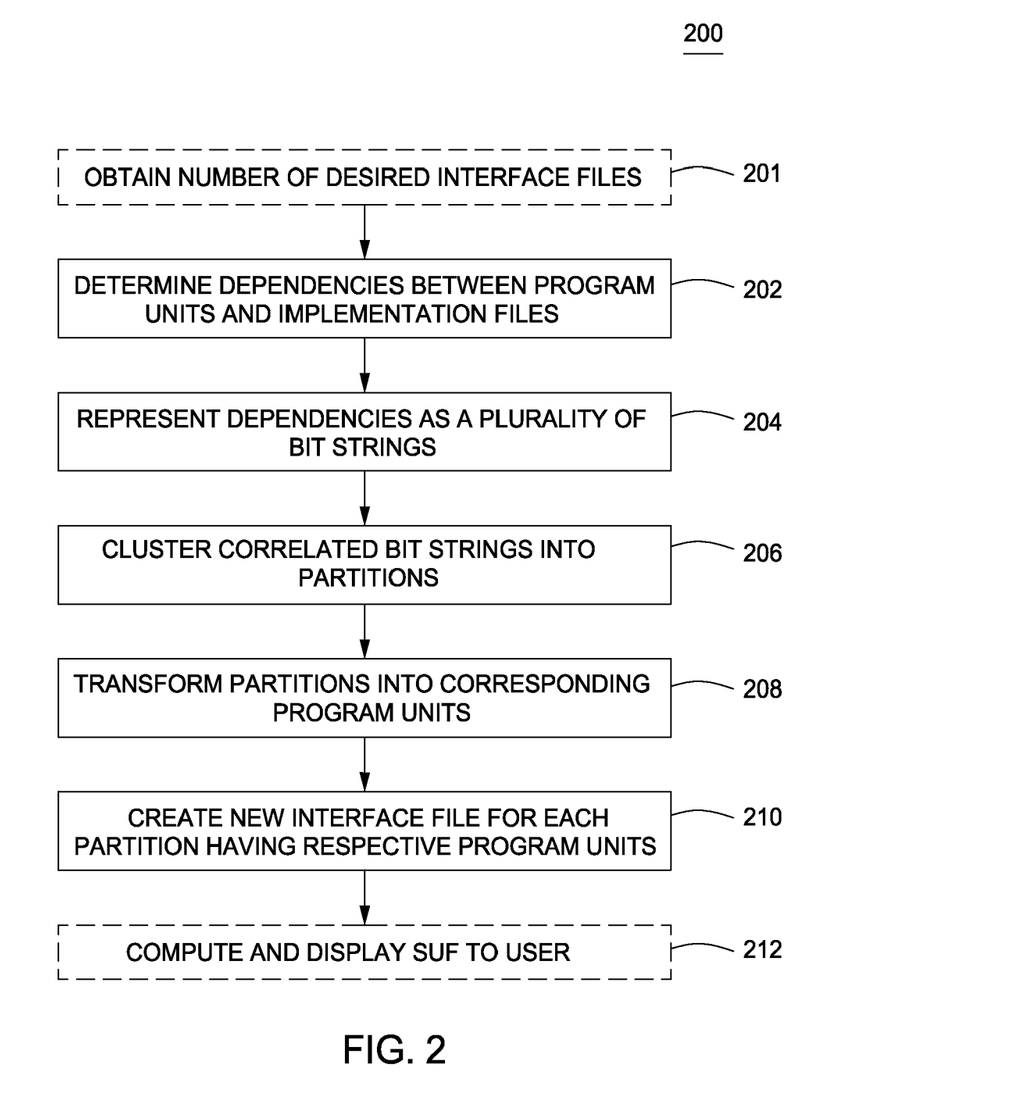
FIG. 2 is a flow diagram depicting an exemplary embodiment of a method for re-factoring a software program hierarchy in accordance with one or more aspects of the invention.

FIG. 2 is a flow diagram depicting exemplary embodiments of a method 200 for restructuring a software program hierarchy in accordance with one or more aspects of the invention. The method 200 may be performed by the refactoring module 150. In one embodiment, the method 200 begins at block 201, where a desired number of interface files to be created by restructuring is selected. The refactoring module 150 may prompt the user for the desired number of interface files. In another embodiment, a default number of interface files may be selected based on the number of the interface files 156. In yet another embodiment, no limit is placed on the number of interface files to be generated by restructuring.

At block 202, dependencies between program units in the interface files 156 and the implementation files 154 are determined. A dependency exists between a program unit and an implementation file if the implementation file includes the interface file having the program unit.

At block 204, the dependencies are represented as a plurality of bit strings. The dependencies may be represented as a bit string matrix. This allows the problem of refactoring to be reduced to that of optimal restructuring of the interface files 156 by data mining, where correlated bit string data is clustered together. A dependency matrix is created of the form (i,j), where i represents implementation files across rows and j represents program units across columns. A value of '0' at a location (i,j) means that the program unit is not required by the implementation file, but is nonetheless included (i.e., a false dependency exists). A value of '1' at a location (i,j) means that the program unit is required by the implementation file (i.e., a true dependency exists).

Once the dependency information has been formulated in terms of the dependency matrix, the problem may be reduced to that of reorganizing the available bit-vectors so as to achieve sets of least false dependency. This leads to the following observations:

1. The reorganization involves partitioning sets of program units, which translates to the problem of partitioning sets of the bit-strings formed by concatenating '1' valued bits and '0' valued bits across columns. One bit string represents the complete dependency information of a program unit on all the implementation files in which it is included.

2. The goal is to maximize true dependency. This essentially means that the program units should be partitioned such that '1' valued bits appearing in a row are maximized. '1' valued bits occurring together in a row represent substantial utilization of the interface file in the implementation file.

3. Partitions should be created in a manner that all '0' valued bits across the rows are clubbed together. All '0' valued bits occurring together in a complete row of a new partition means that the interface file is no longer required by the implementation file. This contributes towards reducing the dependency and preprocessed code size.

4. Partitions should be created to reduce the occurrence of dissimilarity between '1' and '0' valued bits, since dissimilar data represents false dependency and under utilization resulting from inclusion of interfaces in an implementation file. A '1' appearing in a row indicates that the implementation file would have to include the interface file for compilation. By all '0' valued bits appearing with at least one occurrence of a '1' in a row of a partition represent the number of unused program units that the implementation file has to hold due to inclusion of the partitioned interface file.

5. In some embodiments, restructuring is not performed in an uncontrolled manner. A user can specify as input the number of partitions, i.e., the number of interface files that the system should have (block 201). In this manner, the extent of restructuring is controlled. For example, in a system with ten interface files, if only 10% distortion is acceptable to the user, the user can establish a threshold of 11 interface files as input (i.e., 10+10% of 10 equals 11). This ensures that the data will be reorganized into 11 partitions (interface files).

At block 206, correlated bitstrings of the plurality of bit strings are clustered into a plurality of partitions. In particular, analysis of the above observations reveals that the problem of optimal restructuring of interface files is that of collecting the similar data ('1' valued bit with a '1' valued bit and '0' valued bit with a '0' valued bit in a row) and segregating dissimilar data (occurrence of '1' with one or more zeros within one row). This problem can be solved through clustering, which aims to collect objects that are "similar" together into one partition and moves "dissimilar" objects to other partitions. A variety of well-known clustering algorithms may be used to cluster the bit strings into the partitions in accordance with the aforementioned rules.

At block 208, each of the partitions formed at block 206 is transformed into corresponding program units. That is, a partition is a dependency matrix having program units across the columns and implementation files across the rows. At block 210, for each of the partitions, a new interface file is created having the corresponding program unit(s). For each partition, the new interface file is to be included by the implementation files located across the rows of the dependency matrix representing the partition. In this manner, the software program hierarchy is restructured.

Figure 3:
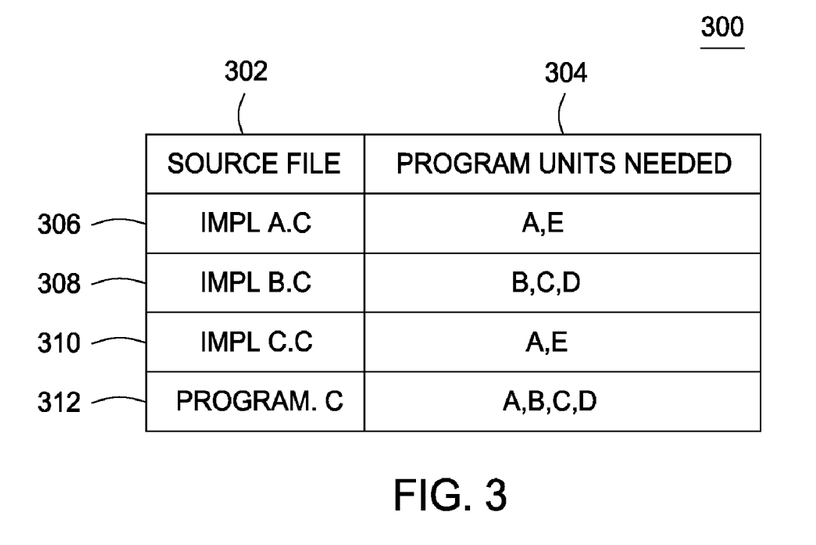
FIG. 3 depicts a table showing an exemplary embodiment of dependencies between implementation files and program units.

Aspects of the method 200 may be understood with reference to the following example. Assume a software hierarchy includes five program units 'a', 'b', 'c', 'd', and 'e'. The program units are initially placed in a single interface file named "interface.h". The software hierarchy also includes four source files implA.c, implB.c, implC.c, and program.c. The implementation files "implA.c" and "implC.c" require declarations of program units 'a' and 'e'; the implementation file "program.c" requires declarations of program units 'a', 'b', 'c', and 'd'; and the implementation file "implB.c" requires declarations of program units 'b', 'c', and 'd'. The dependencies for this example are summarized in FIG. 3 (identified during block 202). That is, FIG. 3 depicts a table 300 having columns 302 and 304, and rows 306 through 312. The column 302 represents the implementation files, and the column 304 represents the program units needed. The row 306 shows that the implementation file implA.c requires program units 'a' and 'e'. The row 308 shows that the implementation file implB.c requires program units 'b', 'c', and 'd'. The row 310 shows that the implementation file implC.c requires program units 'a' and 'e'. The row 312 shows that the implementation file program.c requires program units 'a', 'b', 'c', and 'd'.

Figure 4:
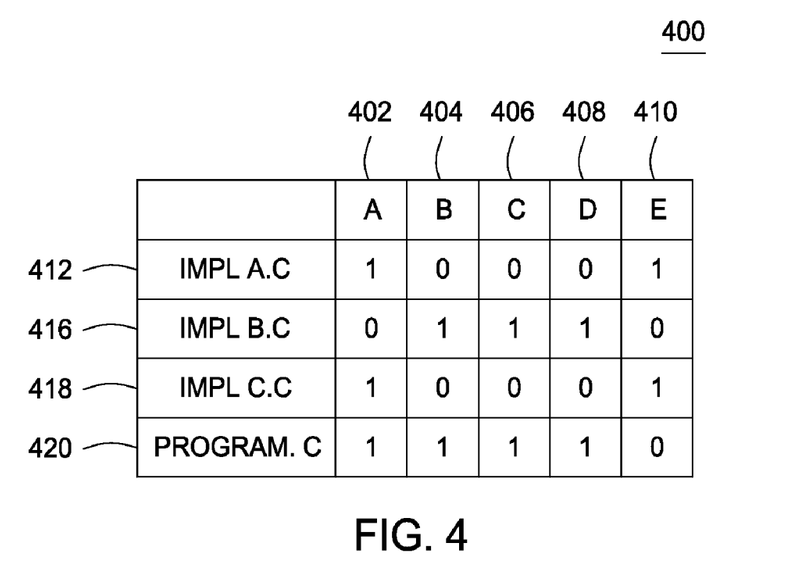
FIG. 4 depicts a table showing an exemplary embodiment of a dependency matrix.

FIG. 4 depicts a dependency matrix 400 formed for the above example (formed during block 204). The dependency matrix 400 includes columns 402-410 and rows 412-420. The columns 402 through 410 relate to the program units a through e, respectively. The rows 412 through 420 relate to the implementation files implA.c, implB.c, implC.c, and program.c, respectively. A location 422 in the matrix 400 includes a one or a zero. A value of one indicates a true dependency, and a value of zero indicates a false dependency. The bit strings generated with respect to the program units across all implementation files are (bits in each column):
program unit a: 1011
program unit b: 0101
program unit c: 0101
program unit d: 0101; and
program unit e: 1010.

Figure 5:
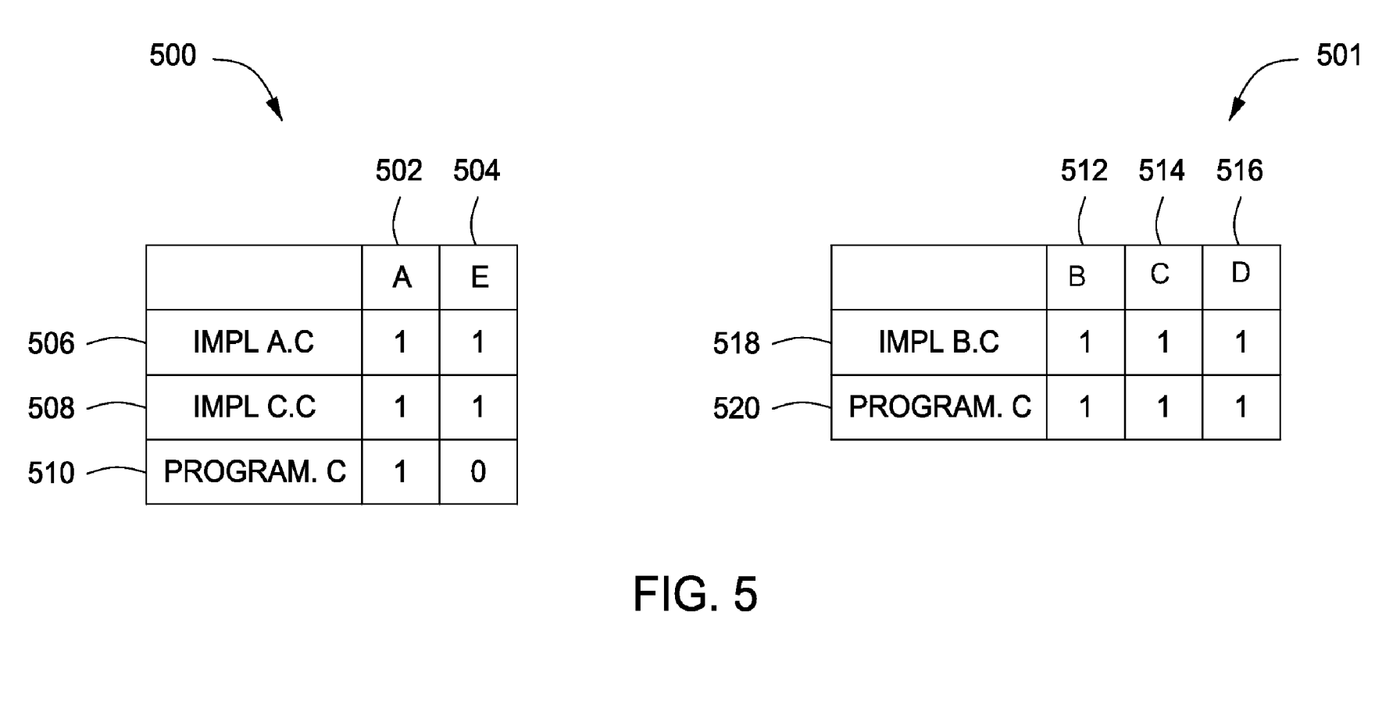
FIG. 5 depicts an exemplary embodiment of partitions created using the method of FIG. 2.

In the above example, it is apparent that the bit strings for program units 'b', 'c' and 'd' are the most correlated (in fact are identical). Also, the dissimilarity between program units 'a' and 'e' is lesser than that between 'a' and 'b'. Thus, if this data is to be restructured into two partitions, the partitions would be {b, c, d} and {a, e} (created during block 206). FIG. 5 shows partitions 500 and 501 created for the example above. The partition 500 includes columns 502 and 504, and rows 506 through 510. The columns 502 and 504 relate to the program units 'a' and 'e', respectively. The columns 506 through 510 relate to the implementation files implA.c, implC.c, and program.c, respectively. The bit string for program unit 'a' includes all ones and thus indicates that a true dependency exists between program unit 'a' and all of the implementation files in the partition. The bit string for program unit 'e' includes two ones and a zero. Thus, the partition 500 only includes a single false dependency (i.e., false dependency between program unit 'e' and implementation file program.c).

The partition 501 includes columns 512 through 516, and rows 518 and 520. The columns 512 through 516 relate to the program units 'b', 'c', and 'd', respectively. The rows 518 and 520 relate to the implementation files implB.c and program.c, respectively. For each of the program units 'b', 'c' and 'd', the respective bit strings include all ones and thus indicate that true dependency exists between the program units 'b', 'c' and 'd' and the implementation files implB.c and program.c.

In the above example, the partition 500 is transformed to program units a and e, and the partition 501 is transformed into program units 'b', 'c' and 'd' (block 208). A new interface file, "interface1.h", is created for the partition 500 having the program units 'a' and 'e' (block 210). The interface file interface1.h is to be included by the implementation files implA.c, implC.c, and program.c. A new interface file, "interface2.h", is created for the partition 501 having the program units 'b', 'c' and 'd' (block 210). The interface file interface2.h is to be included by the implementation files implB.c and main. c.

To get a measure of the true dependency in the system and assess the present dependency structure of the system, in some embodiments a metric is defined by the name of System Utilization Factor (SUF). This metric is motivated from the fact that a program unit is considered as utilized if it is really needed for the compilation of an implementation file. An implementation file's utilization factor (UF) is defined as the ratio of the number of program units that are needed by it and the total number of program units that are actually included via interface files. The average UF for all implementation files in the system is then defined as the SUF.

To define UF and SUF mathematically, consider a software system with 'n' implementation files, such that '$m_i$' is the total number of program units included (via interface files) and '$n_i$' is the number of program units required for compilation of the 'ith' implementation file. By the definition above, the UF for the 'ith' implementation file is:

$$UF_i = n_i/m_i.$$

The SUF may be defined as follows:

$$SUF = \sum_{i=1\ldots n} \frac{(UF_i)}{n}.$$

The ideal SUF for a system totally free of false dependencies is 1. Intuitively what this means is that an implementation file includes an interface file if and only if it requires the entire program units contained therein. So the goal of restructuring the interface files is to achieve an SUF which tends to one. This must be balanced, however, against the amount of restructuring that can be tolerated for the system.

Applying the metric to the example provided above, the initial SUF, which is the ratio of number of ones in a row and the total number of entries (size of matrix) equals to 11/20. After the method 200 is performed to produce two new interface files, the SUF increases to 19/20. This is computed as follows: For implA.c, UF=1 (all functions from {a,e} are used and {b,c,d} cluster is not included). Similarly for implB.c, UF=1, for implC.c, UF=1, for program.c UF=4/5. So the SUF=(1+1+1+4/5)4=19/20.

The SUF can provide an estimate on whether the dependency structure has improved or degraded as a result of restructuring. Thus, in some embodiments, the SUF is reported to the user at optional block 212. The SUF can help the user determine the impact of the restructuring. For example, the user may desire to discard the restructuring, specify another threshold number of partitions (block 201), and re-execute the method 200 in an attempt to achieve a higher SUF.

Figure 6:
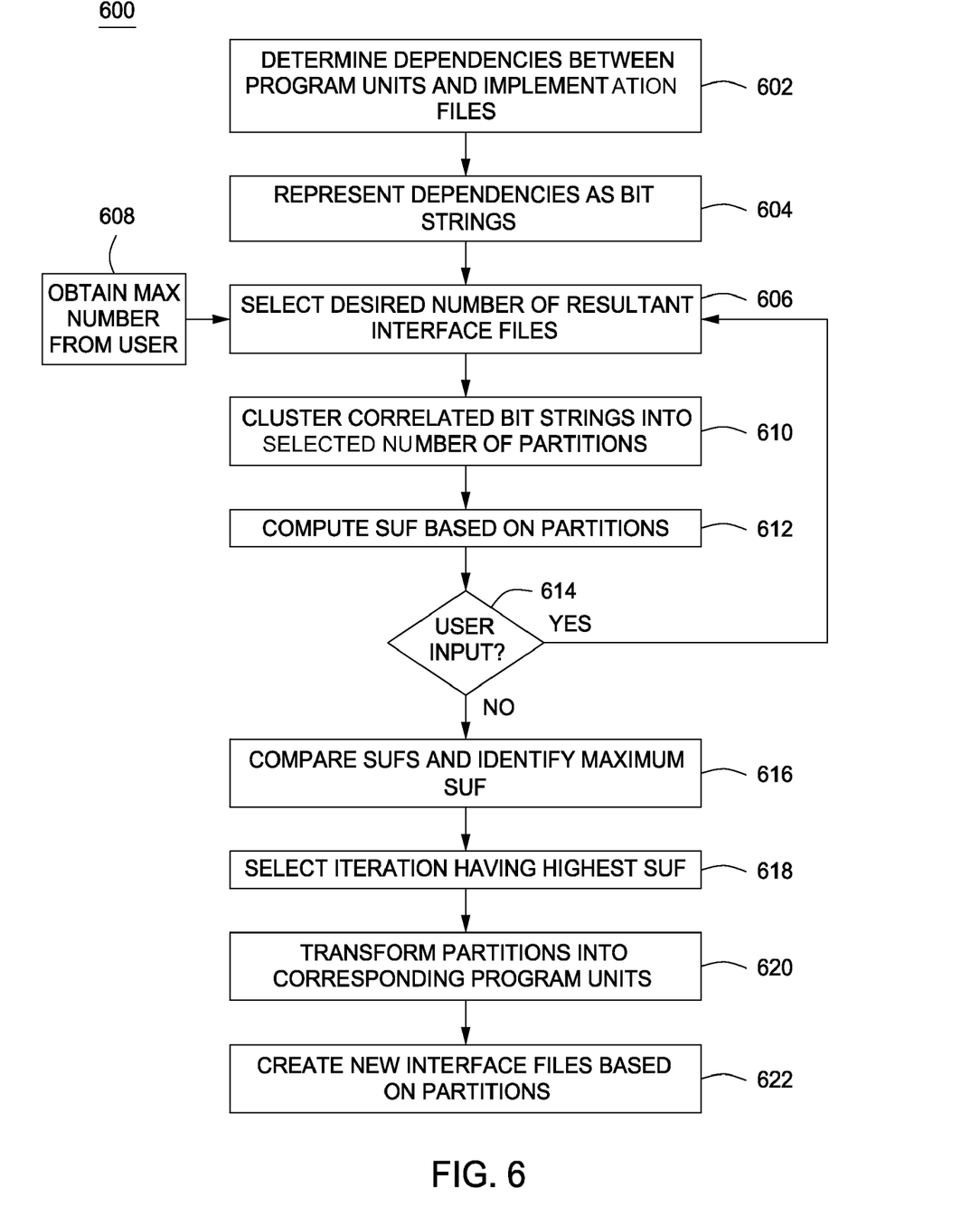
FIG. 6 is a flow diagram depicting another exemplary embodiment of a method for re-factoring a software program hierarchy in accordance with one or more aspects of the invention.

FIG. 6 is a flow diagram depicting an exemplary embodiment of a method 600 for re-factoring a software program hierarchy in accordance with one or more aspects of the invention. The method 600 may be performed by the re-factoring module 150. The method 600 begins at block 602, where dependencies between program units in the interface files 156 and the implementation files 154 are determined. At block 604, the dependencies are represented as a plurality of bit strings. At block 606, a number of interface files to be generated is selected. The number of interface files selected at block 606 may be confined by a maximum number of interface files specified by the user at block 608. At block 610, correlated bitstrings of the plurality of bit strings are clustered into the selected number of partitions.

At block 612, the SUF is computed based on the partitions created at block 610. At block 614, a determination is made whether another iteration should be executed. For example, blocks 606 through 612 may be repeated for a plurality of different numbers of desired interface files (partitions) within a range set by the user (or a default range). If more iterations are necessary, the method 600 returns to block 606 and repeats using another number of desired interface files. Otherwise, the method 600 proceeds to block 616. At block 616, the computed SUFs for the iterations are compared and the highest SUF is identified. At block 618, the iteration having the highest SUF is selected. At block 620, each of the partitions in the selected iteration is transformed into corresponding program units. At block 622, for each of the partitions, a new interface file is created having the corresponding program unit(s).

Aspects of the invention may be understood with reference to the following pseudocode:
Inputs:
List of 'M' source files in the system
List of 'N' program units to be partitioned
Number of headers 'k' suitable for the system.
Output:
Correlated program units refactored as "k" clusters where 2<=k<=n
Algorithm:
1. foreach source file i in M
2. foreach program unit j in N
3. if (program unit is not included in the source file i) continue;
4. Prepare a two dimensional matrix A of order M*N such that

```
    if ( source file i has true dependency for program unit j )
        A[i,j]=1
    else
        A[i,j]=0
    where i<=M, j<=N
```

5. Input the set of bit vectors and k to a clustering algorithm to generate the cluster of bit vectors CLUSTERED_BITVECTORS=CALL_CLUSTERING_ALGO(set of bit_vectors,k)

6. Compute SUF and report SUF to user
7. Based on user input go to step 1 with new user specified 'k' or break from iteration
8. Compare SUFs for iterations and select data with best SUF
9. Transform the clustered bit strings into corresponding program units
10. Collect Program Units in the form of an interface file.

TRANSFORM_BITSTRINGS_TO_HEADERS (CLUSTERED_BITVECTORS).

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method of restructuring a software program hierarchy having interface files and implementation files that include the interface files, comprising:
    determining dependencies between program units in the interface files and the implementation files using a computer;
    representing the dependencies as a plurality of bit strings;
    clustering correlated bitstrings of the plurality of bit strings into a plurality of partitions;
    transforming each of the plurality of partitions into corresponding program units; and
    creating a new interface file having the corresponding program units for each of the plurality of partitions.

2. The method of claim 1, wherein the plurality of bit strings forms a dependency matrix in the form of locations representing the implementation files the program units.

3. The method of claim 2, wherein a value of zero at a location in the dependency matrix represents a false dependency and a value of one at a location represents a true dependency.

4. The method of claim 2, wherein the act of clustering comprises:
    rearranging the dependency matrix into the plurality of partitions such that similar data is clustered within each of the plurality of partitions and dissimilar data is segregated across the plurality of partitions.

5. The method of claim 1, further comprising:
    obtaining a threshold number of partitions;
    wherein the plurality of partitions includes the threshold number of partitions.

6. The method of claim 1, further comprising:
    computing a system utilization factor (SUF) based on the plurality of partitions; and using the SUF to determine whether a dependency structure of the software program hierarchy has improved as a result of the plurality of partitions.

7. The method of claim 6, wherein the act of computing the SUF comprises:
computing a utilization factor (UF) for each of the implementation files as a ratio of a number of the program units required by such implementation file and a total number of program units actually included by such implementation file based on the new interface files; and
averaging the UFs for the implementation files to compute the SUF.

8. Apparatus for restructuring a software program hierarchy having interface files and implementation files that include the interface files, comprising:
means for determining dependencies between program units in the interface files and the implementation files;
means for representing the dependencies as a plurality of bit strings;
means for clustering correlated bitstrings of the plurality of bit strings into a plurality of partitions;
means for transforming each of the plurality of partitions into corresponding program units; and
means for creating a new interface file having the corresponding program units for each of the plurality of partitions.

9. The apparatus of claim 8, wherein the plurality of bit strings forms a dependency matrix in the form of locations representing the implementation files the program units.

10. The apparatus of claim 9, wherein a value of zero at a location in the dependency matrix represents a false dependency and a value of one at a location represents a true dependency.

11. The apparatus of claim 9, wherein the means for clustering comprises:
means for rearranging the dependency matrix into the plurality of partitions such that similar data is clustered within each of the plurality of partitions and dissimilar data is segregated across the plurality of partitions.

12. The apparatus of claim 8, further comprising:
means for obtaining a threshold number of partitions;
wherein the plurality of partitions includes the threshold number of partitions.

13. The apparatus of claim 8, further comprising:
means for computing a system utilization factor (SUF) based on the plurality of partitions; and
means for using the SUF to determine whether a dependency structure of the software program hierarchy has improved as a result of the plurality of partitions.

14. The apparatus of claim 13, wherein the means for computing the SUF comprises:

means for computing a utilization factor (UF) for each of the implementation files as a ratio of a number of the program units required by such implementation file and a total number of program units actually included by such implementation file based on the new interface files; and
means for averaging the UFs for the implementation files to compute the SUF.

15. A non-transitory computer readable medium having stored thereon instructions that, when executed by a processor, cause the processor to perform a method of restructuring a software program hierarchy having interface files and implementation files that include the interface files, comprising:
determining dependencies between program units in the interface files and the implementation files;
representing the dependencies as a plurality of bit strings;
clustering correlated bitstrings of the plurality of bit strings into a plurality of partitions;
transforming each of the plurality of partitions into corresponding program units; and
creating a new interface file having the corresponding program units for each of the plurality of partitions.

16. The computer readable medium of claim 15, wherein the plurality of bit strings forms a dependency matrix in the form of locations representing the implementation files the program units.

17. The computer readable medium of claim 16, wherein a value of zero at a location in the dependency matrix represents a false dependency and a value of one at a location represents a true dependency.

18. The computer readable medium of claim 16, wherein the act of clustering comprises:
rearranging the dependency matrix into the plurality of partitions such that similar data is clustered within each of the plurality of partitions and dissimilar data is segregated across the plurality of partitions.

19. The computer readable medium of claim 15, further comprising:
obtaining a threshold number of partitions;
wherein the plurality of partitions includes the threshold number of partitions.

20. The computer readable medium of claim 15, further comprising:
computing a system utilization factor (SUF) based on the plurality of partitions; and
using the SUF to determine whether a dependency structure of the software program hierarchy has improved as a result of the plurality of partitions.

* * * * *